United States Patent [19]

Uemura

[11] 4,434,831

[45] Mar. 6, 1984

[54] TUBELESS TIRES FOR TRUCKS AND BUSES

[75] Inventor: Yukihisa Uemura, Nara, Japan

[73] Assignee: The Toyo Rubber Industry Co., Ltd., Osaka, Japan

[21] Appl. No.: 344,075

[22] Filed: Jan. 28, 1982

Related U.S. Application Data

[63] Continuation of Ser. No. 170,873, Jul. 21, 1980, abandoned.

[30] Foreign Application Priority Data

Jul. 19, 1979 [JP] Japan ............................. 54-91941

[51] Int. Cl.³ .................. B60C 9/08; B60C 15/00; B60C 15/06
[52] U.S. Cl. .................. 152/356 R; 152/359; 152/354 R; 152/362 R; 152/362 CS; 152/DIG. 9
[58] Field of Search ..... 152/354 R, 354 RB, 355–356, 152/357–359, 362 R, 362 CS, DIG. 9

[56] References Cited

U.S. PATENT DOCUMENTS

| 1,451,645 | 4/1923 | Archer | 152/362 R |
| 3,841,377 | 10/1974 | Montagne | 152/362 CS |
| 4,244,414 | 1/1981 | Uemura et al. | 152/354 R |
| 4,246,949 | 1/1981 | Kawasaki et al. | 152/354 R |

FOREIGN PATENT DOCUMENTS 860151 12/1952 Fed. Rep. of Germany ... 152/362 R

Primary Examiner—Lois E. Boland
Attorney, Agent, or Firm—Wenderoth, Lind & Ponack

[57] ABSTRACT

Tubeless tires for trucks and buses have radial carcass plies of polyester cords turned up around bead wires from the lateral inside to the lateral outside of the carcass walls. Polyester cords of not less than 4,500 d are used for the carcass plies. The compressibility of an inner-bead portion, i.e. that portion of the bead between the bead wire and a bead base is 4% to 35% of the entire inner-bead portion and 7% to 70% of the rubber material portion thereof. The most preferable compressibility is 15% to 20% as to the entire inner-bead portion and 30% to 35% as to the rubber material portion.

3 Claims, 4 Drawing Figures

TUBELESS TIRES FOR TRUCKS AND BUSES

This is a continuation of Ser. No. 170,873, filed July 21, 1980, now abandoned.

BACKGROUND OF THE INVENTION

1. Field of the Invention

This invention relates to tubeless tires for large vehicles such as trucks and buses and more particularly to radial tubeless tires having an improved bead structure.

2. Prior Art

In radial tires for trucks and buses, steel cords are generally used both for a carcass ply layer and a belt layer. For tubeless tires, however, steel cords have the following disadvantages. Namely, pneumatic tires having inner tubes are liable to permit the inner air to escape from the inner tube and to lead outside through the aperture between the tire casing and the inner tube. This means that there is only slight chance of penetration of air and moisture included therein into the tire casing. On the contrary, the tire casing of a tubeless tire is open to the penetration of air and moisture contained therein. The air and moisture penetrating into the tire casing are retained in the spaces of the steel cords. As a result, the steel cords are rusted and in addition the adhesion between the steel cords and rubber compound is damaged.

Instead of steel cords, textile cords such as polyester cords having a strength comparable to steel cords are also used. The number of plies is increased so as to maintain the strength equivalent to that of steel cords. Increasing the number of plies results in an increase of the thickness of the inner-bead portion, i.e. that portion of the bead between a bead wire and a bead base mounted on a rim. Also, a bead seat of a rim used for tubeless tires for trucks and buses is inclined at 15° and the height of the rim flange is very small. Therefore, when a bead wire is positioned outwardly in a radial direction due to an increase of thickness of the inner-bead portion, the radial outward position of the bead wire almost exceeds that of rim flange. As a result, separation of a carcass ply layer adjacent the inside of bead wire occurs.

In case the amount of rubber of the inner-bead portion between the bead wire and bead base is reduced, so as to position the bead wire radially closer to the rim, the bead rubber is more quickly worn by the rim during use of the tire. Consequently, the ply cords will be damaged and a blow-out may occur.

Furthermore, when the amount of rubber at the inner-bead portion is reduced, the compressibility required for mounting the tire on the rim is reduced. An airtight seal of a tubeless tire is achieved by mounting a bead portion of the tire on a bead seat of the rim under conditions such that the inner-bead portion located between the bead wire and bead seat is compressed. As a textile cord is only slightly compressible, when the inner-bead portion is occupied substantially by textile cords instead of rubber material, the bead will not have sufficient compressibility for mounting the tire on the rim. Thus, the tire can not easily be mounted on the rim or the mounting condition will be uneven around the circumference of the rim, thus resulting in the lack of an air tight seal, and also undesirable vibration may occur.

SUMMARY OF THE INVENTION

It is an object of the present invention to provide a tubeless tire for large vehicles such as trucks and buses having a carcass of textile ply cords, especially polyester cords, wherein the strength of a bead portion of the tire is maintained without increasing the number of plies, thereby avoiding the necessity of increasing the thickness of the inner-bead portion of the tire bead, i.e. that bead portion between a bead wire and a bead base, while maintaining a desirable compressibility of the inner-bead portion. This improves the strength and durability of the bead portion and results in a good airtight seal between the bead base of the tire and the bead seat of a rim.

The object is accomplished in accordance with the present invention by providing a tubeless tire for trucks and buses having radial carcass plies of polyester cords which are turned up around a bead wire from the lateral inside to the lateral outside, wherein polyester cords having a fineness of not less than 4,500d are used and the compressibility of the inner-bead portion is 4% to 35% of the entire inner-bead portion and 7% to 70% as to rubber material contained therein.

The polyester cords of not less than 4,500d have considerable strength, and thus the number of plies can be reduced so as not to increase the thickness of the inner-bead portion, without decreasing the amount of rubber material contained therein. Consequently, the bead wire is positioned at a relatively inward radial position without exceeding the radial height of the rim flange. This avoids the occurrence of separation of the carcass ply layer at the inside of the bead wire. Also, since the amount of rubber is not decreased, the bead portion retains good strength and durability.

The compressibility of the inner-bead portion is defined so as to achieve good mounting conditions. The compressibility of the inner-bead portion with respect to the entire composition thereof is a percent value of compression allowance to the entire thickness of the inner-bead portion. The compressibility of the rubber material contained in the inner-bead portion is a percent value of compression allowance to the entire thickness of the ruber materials in the inner-bead portion, i.e. the thickness obtained by reducing the entire thickness of the cords from the entire thickness of the inner-bead portion. If the compressibility of the inner-bead portion is 4% to 35% of the entire inner-bead portion thickness and 7% to 70% of the thickness of the rubber materials contained therein, good mounting conditions are obtained. The tire then can be mounted easily and evenly along the circumference of the rim with a good airtight seal between the bead base and the bead seat of the rim. Such stable and reliable mounting eliminates the occurrence of separation in the bead portion and undesirable vibration of the vehicle.

In order to obtain the desirable compressibility mentioned above, or more favorable compressibility defined as 15% to 20% of the thickness of the entire inner-bead portion and 30% to 35% of the thickness of the rubber material portion thereof, the carcass plies may be so constructed that some of the plies are not turned up around the bead wire, but rather are terminated at the inner side of the bead wire so as to eliminate the thickness of the inner-bead portion.

DETAILED DESCRIPTION OF THE INVENTION

Figure 1:
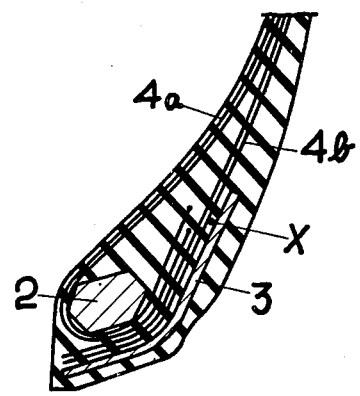
FIG. 1 is a cross-sectional view of the bead portion of a tire having a carcass of polyester plies, wherein half of the plies are turned up around the bead wire from the inside to the outside thereof and the remaining half extend along the inner side of a steel chafer.
Figure 2:
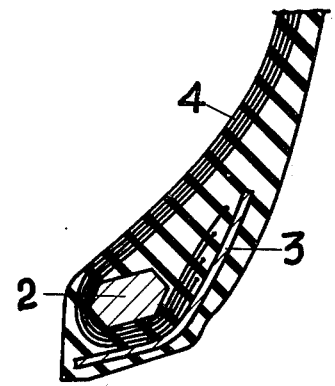
FIG. 2 is a cross-sectional view of the bead portion of another type of polyester carcass structure, wherein all plies are turned up around the bead wire from the inside to outside thereof.

Tire carcass structures formed with polyester cords generally are of two types. One type is as shown in FIG. 1. In a carcass having four plies as shown in FIG. 1, two plies of polyester cords 4a are turned up around a bead wire 2 of the carcass, laterally from the inside to outside of the carcass, and the remaining two plies 4b extend along the lateral inside of a steel chafer 3. Rubber material surrounds the plies. Another type of carcass structure is as shown in FIG. 2, wherein all four plies of polyester cords extend along the inside wall of the carcass and turned up around the bead wire 2 and extend along the lateral inside of the steel chafer 3. In the former structure, shown in FIG. 2, the outer two plies 4b are apt to be subjected to fatigue in the vicinity of point X. Accordingly, the carcass structure of polyester cords as shown in FIG. 2 is related to this invention.

Figure 3:
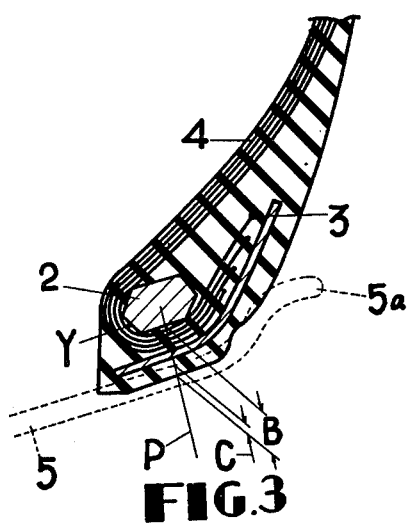
FIG. 3 is a cross-sectional view of a bead portion and is relationship to a whell rim, in accordance with an embodiment of this invention.

Shown in FIG. 3 is a bead portion of a tire having the carcass ply structure as shown in FIG. 2. Four plies of polyester cords 4 are all turned up around the bead wire or core 2 along the lateral inside of steel chafer 3. A rim 5 on which a tubeless tire is mounted is shown by the dotted lines in FIG. 3 and includes a rim flange 5a. An airtight seal of a tubeless tire is achieved by the compressed mounting of the base of the bead portion of the tire onto the bead seat of the rim. With reference to a line P extending through the center of the bead seat of the rim 5 and the center of the bead wire 2, an inner-bead portion is defined as the portion of the bead between the bead wire 2 and the bead base and is designated in FIG. 3 by reference letter B. A tubeless tire is mounted on rim 5 to have an airtight seal by compressing the inner-bead portion B by an amount equal to a compression allowance designated as reference letter C. The carcass structure includes circumferentially extending beads adapted to abut a wheel rim 5 to mount thereon the carcass structure. Each bead includes a radially inner bead base for sealingly contacting rim 5 when the carcass structure is mounted thereon, a bead core 2 at a position radially outwardly of the bead base, and an inner-bead portion extending radially from the bead core to the bead base.

If the number of plies are increased in order to achieve a carcass strength equivalent to a carcass having steel cords, the thickness of the inner-bead portion B will be increased. This causes the bead wire 2 to be positioned relatively further outwardly in a radial direction. As a result, and since the bead seat of rim 5 is inclined only at a small angle, such as 15°, the radial position of bead wire 2 will be outwardly of the radial position of rim flange 5a. Such construction is likely to induce separation at the lateral inside of the bead wire 2 as indicated at Y.

Attempting to avoid this problem by decreasing the amount of rubber used in the inner-bead portion B results in wear of the rubber of the bead by the bead seat of the rim 5.

In accordance with the present invention, polyester cords of not less than 4,500d are used for the carcass plies to maintain the desired strength without increasing the number of plies and/or decreasing the amount of rubber of the inner-bead portion. And further, according to this invention, the compressibility of the inner-bead portion is studied instead of merely studying the thickness of the inner-bead portion or the amount of rubber used for the inner-bead portion.

The compressibility of the inner-bead portion, in accordance with this invention, refers both to the compressibility of the inner-bead portion in its entirety and to the compressibility of rubber material contained in the inner-bead portion.

To exceed the upper limit of the range of compressibility, as determined in accordance with the present invention, results in a tire that cannot easily be mounted on a rim and that, once mounted, is uneven along the circumference of the rim. Thereby, separation in the bead portion or undesirable vibration of the vehicle results.

On the other hand, when the compressibility is less than the lower limit, as determined in accordance with the present invention, air will escape from the mounted tire.

The preferred compressibility ranges according to the present invention are listed below with reference to percentage values of the compression allowance C to the entire thickness of the complete inner-bead portion B and to the thickness of the rubber material portion of the inner-bead portion, defined by R.

The percent value of C/B is 4% to 35% and the percent value of C/R is 7% to 70%, and the most preferable values are 15% to 20% as to C/B and 30% to 35% as to C/R.

Figure 4:
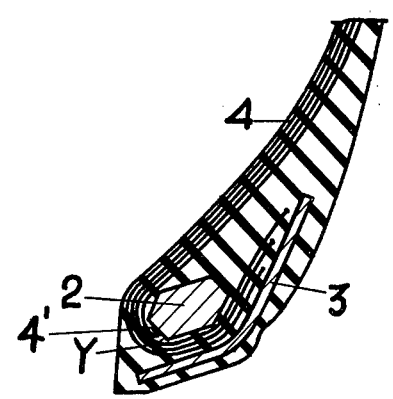
FIG. 4 is a cross-sectional view of the bead portion of another embodiment in accordance with this invention.

Shown in FIG. 4 is another embodiment of a carcass structure in accordance with the present invention. In this embodiment, most of the carcass plies 4 of polyester cords are turned up around the bead wire 2 along the lateral inside of steel chafer 3. However, at least one of the carcass plies 4 has an end which terminates at an inside position Y of the bead wire without extending through the inner-bead portion. Thus, as shown in FIG. 4, one ply 4 has an end 4 which terminates adjacent the lateral inside of wire 2 at position Y. However, more than one of the plies could have ends thus terminating. Thus, the number of plies turned up around the bead core is less than the total number of plies within the carcass structure. Such a carcass structure is advantageous for the purpose of reducing the thickness of the inner-bead portion to prevent the compressibility of the inner-bead portion from exceeding the desired ranges or for obtaining the most preferable ranges of the compressibility.

The following table shows relationships among various cord materials, number of plies required and the thickness of the inner-bead portion B, when the compressibility of the inner-bead portion is 15% to 20% as to C/B and 30% to 35% as to C/R.

| Cord materials | Steel (7×4×0.22+1) | Polyester | | | |
|---|---|---|---|---|---|
| | | 2000d | 3000d | 4500d | 4500d* |
| Number of plies required | 1 | 8 | 6 | 4 | 4 |
| Thickness of inner-bead portion B | 10.5 | 14.0 | 13.0 | 11.5 | 10.5 |

| Cord | Steel | Polyester | | | |
|---|---|---|---|---|---|
| materials | (7×4×0.22+1) | 2000d | 3000d | 4500d | 4500d* |
| (mm) | | | | | 5 |

*In the polyester column, the fourth column as to 4500 d polyester cords relates to the carcass structure as shown in FIG. 4, wherein one ply of four carcass plies is terminated at the inside portion Y of the bead wire.

As is apparent from the above table, the thickness of the inner-bead portion containing the carcass plies of 4500d polyester cords is close to the thickness of the inner-bead portion containing carcass plies of steel cords, and especially in the carcass structure wherein the number of plies turned up around the bead wire is less than the total number of plies in the carcass structure, the thickness of the inner-bead portion can be made equal to the thickness of an inner-bead portion containing steel cords.

Further, after a tire was used, it was tested as to fatigue and reduction of strength of the plies turned up around the bead wire. The result was that the plies of the tire casing had a 10% to 15% reduction of strength compared with new plies, but the plies turned up around the bead wire had little reduction in strength. The results also are applicable to the carcass structure wherein the number of plies turned up around the bead wire is less than the number of plies in the tire casing. This is due to the fact that the reduction of strength of the plies in the tire casing is due to the inner pressure exerted thereon and the repeated deformation thereof due to driving surface contact, but the plies turned up around the bead wire are less influenced by such inner pressure and deformation. Therefore, it will be understood that the reduction of the number of plies turned up around the bead wire does not result in a reduction of strength in the carcass.

What is claimed is:

1. A tubeless tire for mounting on a wheel rim of a large vehicle such as a truck or a bus, said tire comprising:
   a carcass structure including a plurality of radial carcass plies of polyester cords having a fineness of no less than 4500 denier and rubber material surrounding said plies;
   said carcass structure including circumferentially extending beads adapted to abut a wheel rim to mount thereon said carcass structure;
   each said bead including a radially inner bead base for sealingly contacting the wheel rim when said carcass structure is mounted thereon, a bead core at a position radially outwardly of said bead base, and an inner-bead portion extending radially from said bead core to said bead base;
   all of said plies except one said ply having end portions turned up around said bead core and extending through said inner-bead portion, and said one ply having an end portion terminating adjacent said bead core without being turned up around said bead core and without extending through said inner-bead portion; and
   said inner-bead portion having a compressibility, between an unmounted condition and a condition mounted on a wheel rim, of 15 to 20% of the total thickness of said inner-bead portion including said ply end portions and rubber material therearound and of 30 to 35% of the thickness of said rubber material only.

2. A tire as claimed in claim 1, wherein said carcass structure includes four said plies, said end portions of three of said plies being turned up around said bead core, and the end portion of the fourth said ply terminating adjacent said bead core without being turned up around said bead core and without extending through said inner-bead portion.

3. A tire as claimed in claim 1, wherein said bead further includes therein, at a position axially outwardly of said bead core, a steel chafer, and said end portions extend along a lateral inner side of said steel chafer.

* * * * *